United States Patent
Cury et al.

(10) Patent No.: US 11,372,314 B2
(45) Date of Patent: Jun. 28, 2022

(54) PROTECTIVE CAMERA ENCLOSURE

(71) Applicant: EarthCam, Inc., Upper Saddle River, NJ (US)

(72) Inventors: Brian Cury, Alpine, NJ (US); Robert Joseph Altieri, Fort Lee, NJ (US)

(73) Assignee: EarthCam, Inc., Upper Saddle River, NJ (US)

( * ) Notice: Subject to any disclaimer, the term of this patent is extended or adjusted under 35 U.S.C. 154(b) by 0 days.

(21) Appl. No.: 17/167,740

(22) Filed: Feb. 4, 2021

(65) Prior Publication Data

US 2021/0240055 A1 Aug. 5, 2021

Related U.S. Application Data

(60) Provisional application No. 62/969,850, filed on Feb. 4, 2020.

(51) Int. Cl.
*G03B 17/08* (2021.01)
*G08B 13/196* (2006.01)
(Continued)

(52) U.S. Cl.
CPC ............. *G03B 17/08* (2013.01); *F16M 13/02* (2013.01); *G03B 17/561* (2013.01); *G03B 17/563* (2013.01); *G08B 13/19619* (2013.01)

(58) Field of Classification Search
CPC ............ G08B 13/1961; G08B 13/1963; G08B 13/19617; G08B 13/19619
See application file for complete search history.

(56) References Cited

U.S. PATENT DOCUMENTS

| | | | |
|---|---|---|---|
| 7,593,632 B2 * | 9/2009 | Schnell | G03B 17/00 396/153 |
| 8,421,861 B2 * | 4/2013 | Barley | G03B 17/02 348/143 |

(Continued)

FOREIGN PATENT DOCUMENTS

| | | | |
|---|---|---|---|
| CN | 109618078 A | * | 4/2019 |
| CN | 208849925 U | * | 5/2019 |
| KR | 20090005867 A | * | 1/2009 |

OTHER PUBLICATIONS

"How to Make a Long Term Time-lapse", https://www.instructables.com/How-to-make-a-long-term-time-lapse/, retrieved Oct. 20, 2021 (Year: 2012).*

*Primary Examiner* — Leon W Rhodes, Jr.
(74) *Attorney, Agent, or Firm* — Michael J. Brown (57) ABSTRACT

The present invention is a protective enclosure for a camera, formed of front and rear housings that are joined together by a weather resistant seal. An internal cavity is formed in which the camera may be located. The front housing includes a window that allows light to pass through, where the lens of the camera preferably is placed to line up with the window. A hood is provided around the window to provide shielding for the window and to divert rainwater away from the window. The housing includes support brackets for mounting the camera within the internal cavity. The front and rear housings are attached to each other by fasteners, with a weather resistant seal at the joining of the two parts. The rear part of the housing includes a weather resistant power port, through which power and/or data can be supplied to the camera.

18 Claims, 10 Drawing Sheets

(51) Int. Cl.
*F16M 13/02* (2006.01)
*G03B 17/56* (2021.01)

(56) References Cited

U.S. PATENT DOCUMENTS

| | | | |
|---|---|---|---|
| 8,974,128 B2 * | 3/2015 | Cuddeback | F16M 11/041 |
| | | | 396/419 |
| 10,205,913 B2 * | 2/2019 | Smith | H04N 7/181 |
| 11,042,077 B2 * | 6/2021 | Bei | G03B 17/561 |

* cited by examiner

PROTECTIVE CAMERA ENCLOSURE

FIELD OF INVENTION

The invention is in the field of camera enclosures, designed to protect a camera contained therein from environmental conditions and from theft.

BACKGROUND

Cameras used for security and for monitoring events, construction projects, and indoor activities may be located outside of buildings or other protective structures, in hard to reach areas within buildings, and/or may be in locations where the camera is exposed to a variety of environmental conditions. While such cameras can be placed in sealed enclosures, such enclosures often must be opened to allow access to the camera for changing recording media, changing batteries or power supplies, or testing of the camera, compromising the integrity of the sealed enclosure.

It is desired to have a protective enclosure for a camera which allows for the operation of the camera, and does not require constant monitoring. It is further desired that the protective enclosure be water and weather resistant. It is desired that the enclosure permit the camera to be monitored and also allow for power to be supplied to the camera for long term operation.

SUMMARY

The present invention is a protective enclosure for a camera, formed of a front housing and a rear housing that are joined together to form a water and weather resistant seal. The front and rear housings are formed of water and weather resistant materials. When the front and rear housings are joined together, an internal cavity is formed in which the camera may be located. The front housing includes a window that allows light to pass through. A hood is provided around the window to provide protective shielding for the window, and to divert rainwater or foreign objects or debris away from the window, to prevent obstructions that might interfere with the operation of the enclosed camera. The hood may include a diverter wall for additional water and debris diversion.

At least one of the front and rear housings includes support brackets for mounting the camera within the internal cavity, ensuring that the camera lens is properly aligned to the window. The support brackets also provide stability for camera, limiting or reducing movement with respect to the enclosure. The support brackets or the fasteners thereof preferably are in direct contact with an external mounting bracket for the rear housing. This direct contact provides for greater stability of the camera being supported in the enclosure.

The front and rear housings are preferably attached to each other by fasteners such as screws, with a water and/or dirt resistant seal located at the joining of the front and rear housings.

The rear housing includes a weather resistant electrical port, through which power can be supplied to the camera. The electrical port may also allow for data to be transferred from the camera to a remote device or transmitter. The rear housing may also include a display for providing camera function information, such as power status and operational information.

BRIEF DESCRIPTION OF THE DRAWINGS

The attached drawings show the features of the invention.

DETAILED DESCRIPTION

The invention preferably consists of a two-part enclosure 100 for supporting and containing a camera and other components such as batteries, power supply, charge controller, transmitter, processor, and camera accessories, where a front housing 5 may be joined with a rear housing 6 at the closure 7.

Both front housing 5 and rear housing 6 are comprised of water and weather resistant materials, to protect the contents of the enclosure 100. Front housing 5 has a first exterior surface 50 and front walls 55 extending rearward around and defining a first interior cavity 51, with a first joining edge 52 along a periphery along the front walls 55 around first interior cavity 51. Rear housing 6 has a second exterior surface 60 and rear walls 65 extending forward around and defining a second interior cavity 61, with a second joining edge 62 along a periphery along the rear walls 65 around second interior cavity 61.

First joining edge 52 and second joining edge 62 interact with each other to form a continuous closure 7 for the enclosure. One or both of first joining edge 52 and second joining edge 62 may include a pliable strip 70 to ensure a water and weather resistant seal for closure 7.

Front housing 5 has a window 3 preferably comprised of optically clear glass. In use, a camera (not shown) would be positioned within enclosure 100, with the camera lens positioned in line with window 3.

A hood 30 is formed on first exterior surface 50 of front housing 5, around window 3, for the diversion of water, dirt or debris around and away from window 3. At the bottom of window 3, a chamfered edge 24 is formed on first exterior surface 50, to prevent the buildup of water, dirt or debris against window 3. Window 3 may also be further sealed with sealing strip 37.

Hood 30 surrounds the top and sides of window 3, and hood wall 31 located above hood 30 further diverts water, dirt or debris from flowing on or in front of window 3. Diverting slope 36 is preferably located above hood 30 and behind hood wall 31 to assist with diverting water, dirt or debris away from window 3. Additional channels 32 may be formed in first exterior surface 50 at the sides of window 3 for further water, dirt or debris diversion. Channels 32 provide paths of travel for water, dirt or debris to the sides of window 3, preferably preventing the water, dirt or debris from moving in front of window 3. Keeping window 3 free from water or debris reduces the need for cleaning window 3 during use of the enclosure, allowing for the enclosure and enclosed camera to operate with limited maintenance.

At least one of front housing 5 and rear housing 6 has a power receptacle 11 capable of providing power to a camera or other devices within enclosure 100. In the preferred embodiment, power receptacle 11 is provided in rear housing 6. Power receptacle 11 preferably has a removable weather resistant cover 110, which may be removed to allow access. Power receptacle 11 may also allow for a weather resistant connection to an external power cord for a persistent power connection to enclosure 100. In a preferred embodiment, power receptacle 11 is located within a recessed area 65 of second exterior surface 60 of rear housing 6. The recessed area 65 aids in diverting water away from power receptacle 11. Recessed area 65 preferably has an angled surface, so that water would not accumulate near power receptacle 11.

At least one of front housing 5 and rear housing 6 may also have a display on their respective exterior surface for providing operational information about the camera. The display may be a second window 12 that allows for visual inspection of operational information on a camera contained within the enclosure. The display may also be a status indicator 10, such as a LED or LCD screen or series of lights. The display is preferably recessed from first exterior surface 50 or second exterior surface 60 to protect the display from impact or debris, while still providing a visible display for the user.

At least one of front housing 5 and rear housing 6 may also have a data port, allowing for the transmission of data from the camera to a remote device, such as a USB drive or transmission device. In one embodiment, the data port may be incorporated with the power receptacle 11, such as a USB plug as is known in the art. Data port may configured for USB, Ethernet, or other data transmission protocols as are known in the art. Either the camera or enclosure 100 may also comprise a Bluetooth or other wireless data connection to allow for transmission of data from the camera to a remote device.

Rear housing 6 preferably includes mounting support 130, which mounting support allows for enclosure 100 to be attached to a supporting structure, such as a pole, wall, or building. Mounting support 130 preferably provides for multi-directional positioning of the enclosure 100 and the camera contained therein, so that the camera may be directed toward a specific subject or area. The multi-directional positioning may include rotation along X, Y, and Z axes, or tilt and pan movement. By tilting the position of enclosure 100, the camera may capture images below enclosure 100. Mounting support 130 may itself be powered or controlled for remote operation. Mounting support 130 may itself be one of a variety of different types of supports as are known in the art, such as a first mounting bracket 13 which is attached to rear housing 6, and a second mounting bracket 14 moveably connected to first mounting bracket 13 by mounting hardware 15, as shown in FIGS. 2, 3, 8, 9, and 10. While the drawings show a mounting support capable of rotation only in one axis of movement, multiple axes of movement are well known in the art.

Figure 10:
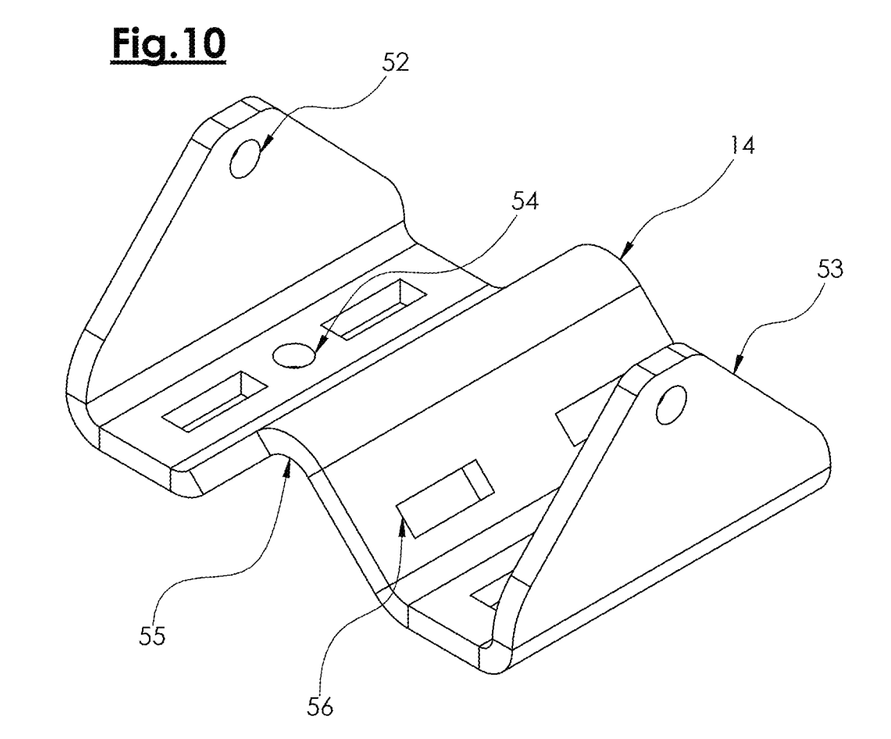
FIG. 10 shows a perspective view of a second mounting support for the enclosure.

Second mounting bracket 14 preferably is configured to allow for a variety of different mounting options for enclosure 100, including an indented channel 55 and slots 56 which would allow for mounting on a pole with additional attachment straps extending through the slots, and holes 54 for attaching second mounting bracket 14 to a flat surface with fasteners such as screws or nails, as is known in the art.

Rear housing 6 may also include a recessed and reinforced area 66 to engage camera support 18, and reinforced mounting area 68 for engaging mounting support 130.

The shape of enclosure 100, front housing 5 and rear housing 6 have been designed around the most compact arrangement of the internal components of enclosure 100, as well as placement of a camera and other devices anticipated to be contained in enclosure 100, in order to occupy the internal space of the enclosure in an efficient manner.

Enclosure 100 may also comprise foam padding or other cushioning materials to provide shock protection for the camera contained within the enclosure.

The exterior of enclosure 100 may also include support feet 9, so that enclosure 100 may be placed on a surface during use. Where the enclosure is placed on a surface where water may accumulate, support feet 9 raise the enclosure, to avoid the enclosure from remaining in standing water and where such standing water may enter the enclosure through a leak in a seal. Support feet 9 may be fixed or adjustable to allow for positioning of the enclosure and the camera contained therein. Support feet 9 are preferably pitched at an angle with respect to enclosure 100, so as to tilt the camera view upward, and to avoid having the camera field of view take in too much of the surface below the enclosure. The angle of support feet 9 is preferably between two and 10 degrees.

The exterior of enclosure 100 may also include a handle 1 for ease of transport.

Figure 1:
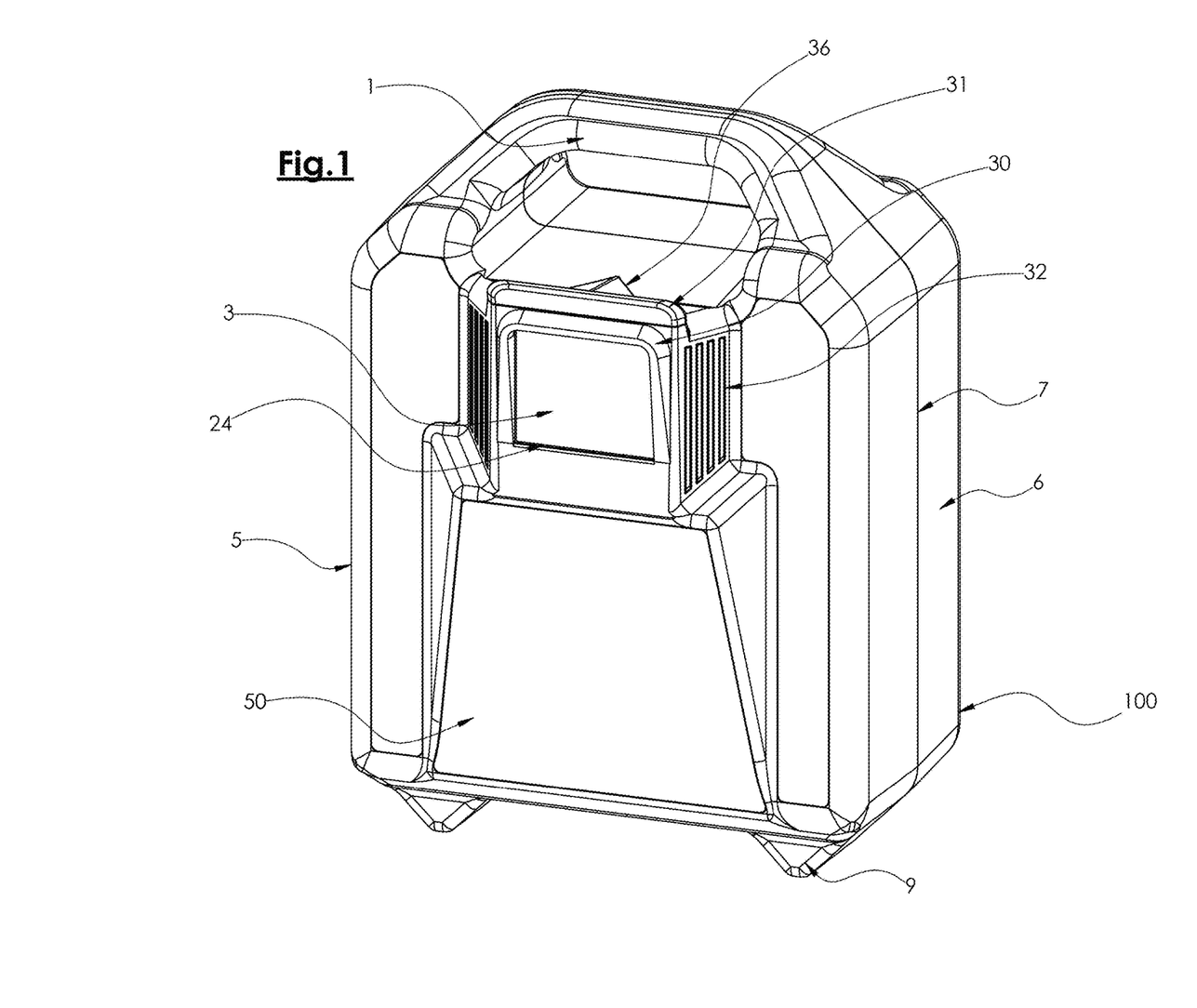
FIG. 1 shows a front perspective view of the novel enclosure.
Figure 2:
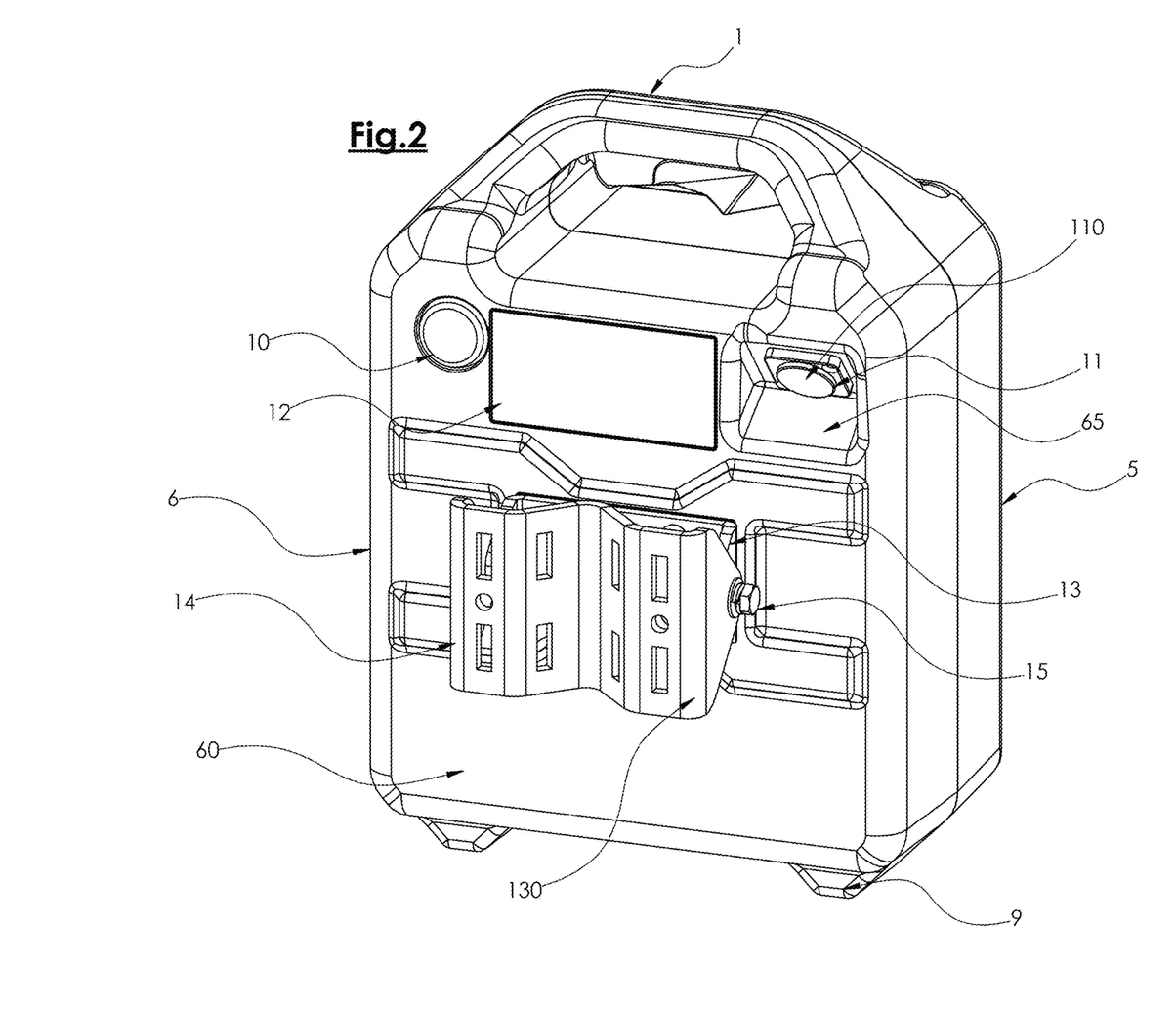
FIG. 2 shows a rear perspective view of the enclosure.
Figure 3:
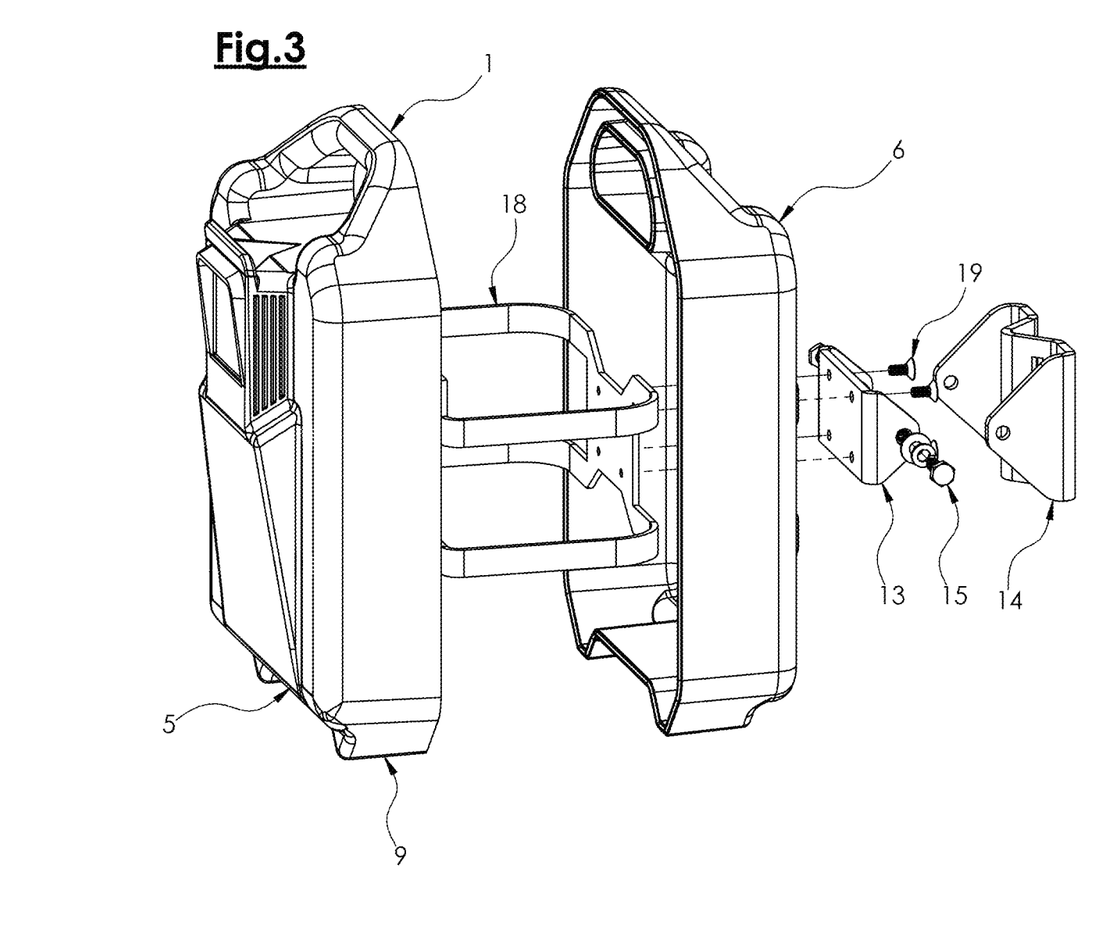
FIG. 3 shows an exploded side view of the enclosure and support brackets.
Figure 4:
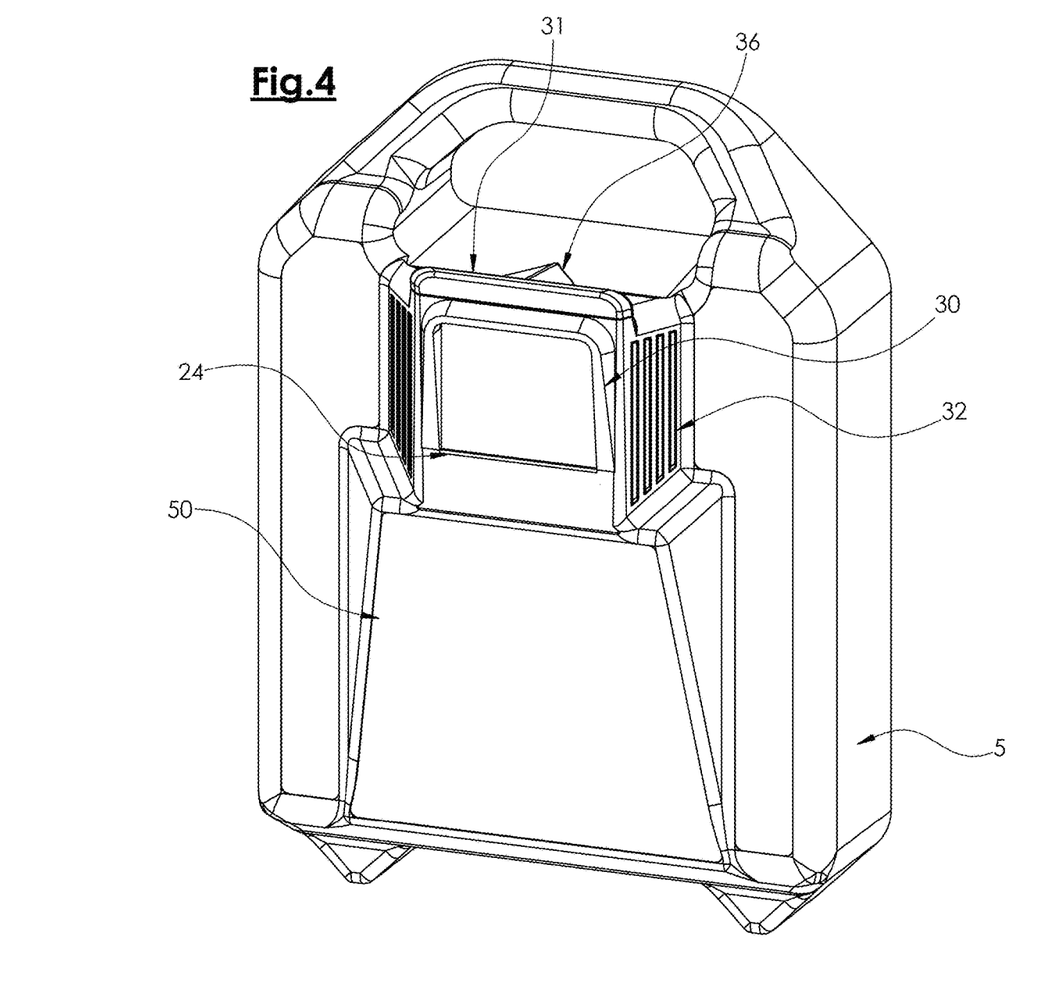
FIG. 4 shows a front perspective view of the front housing of the enclosure.
Figure 5:
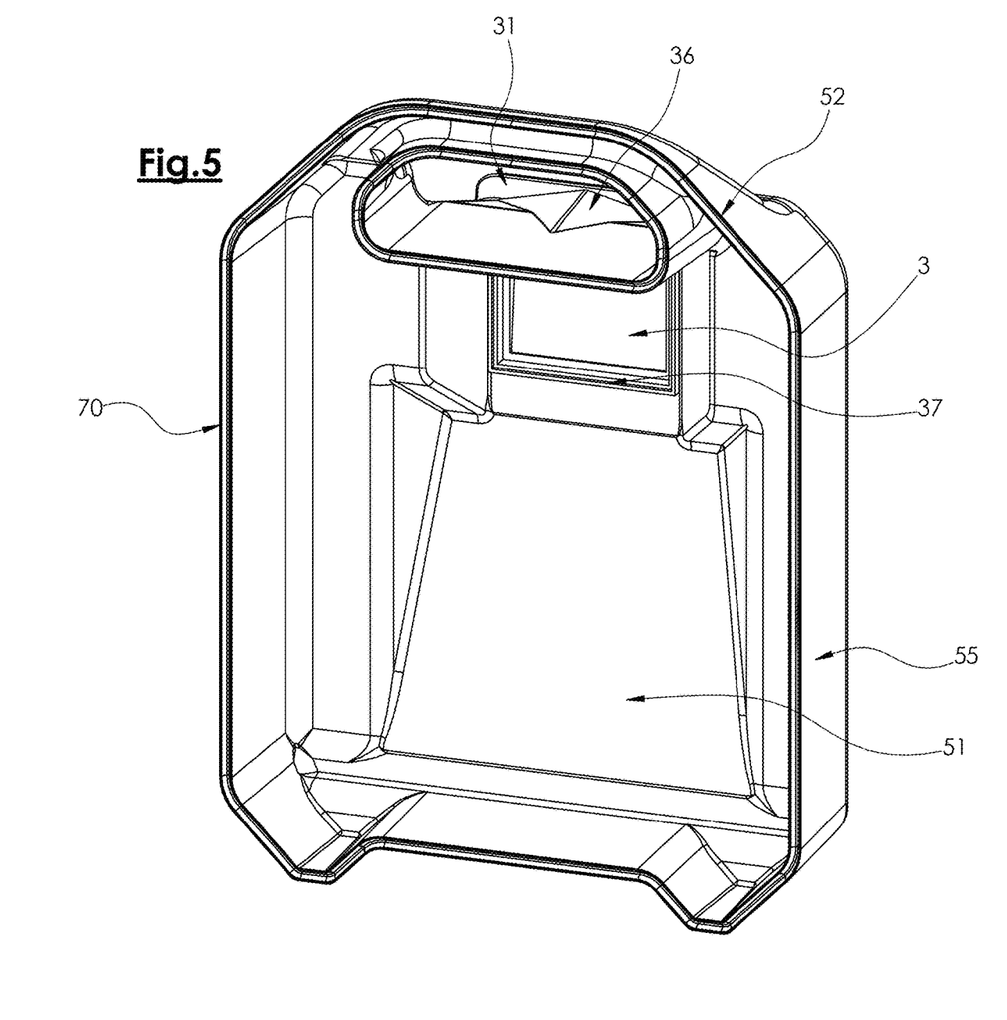
FIG. 5 shows a rear perspective view of the front housing of the enclosure.
Figure 6:
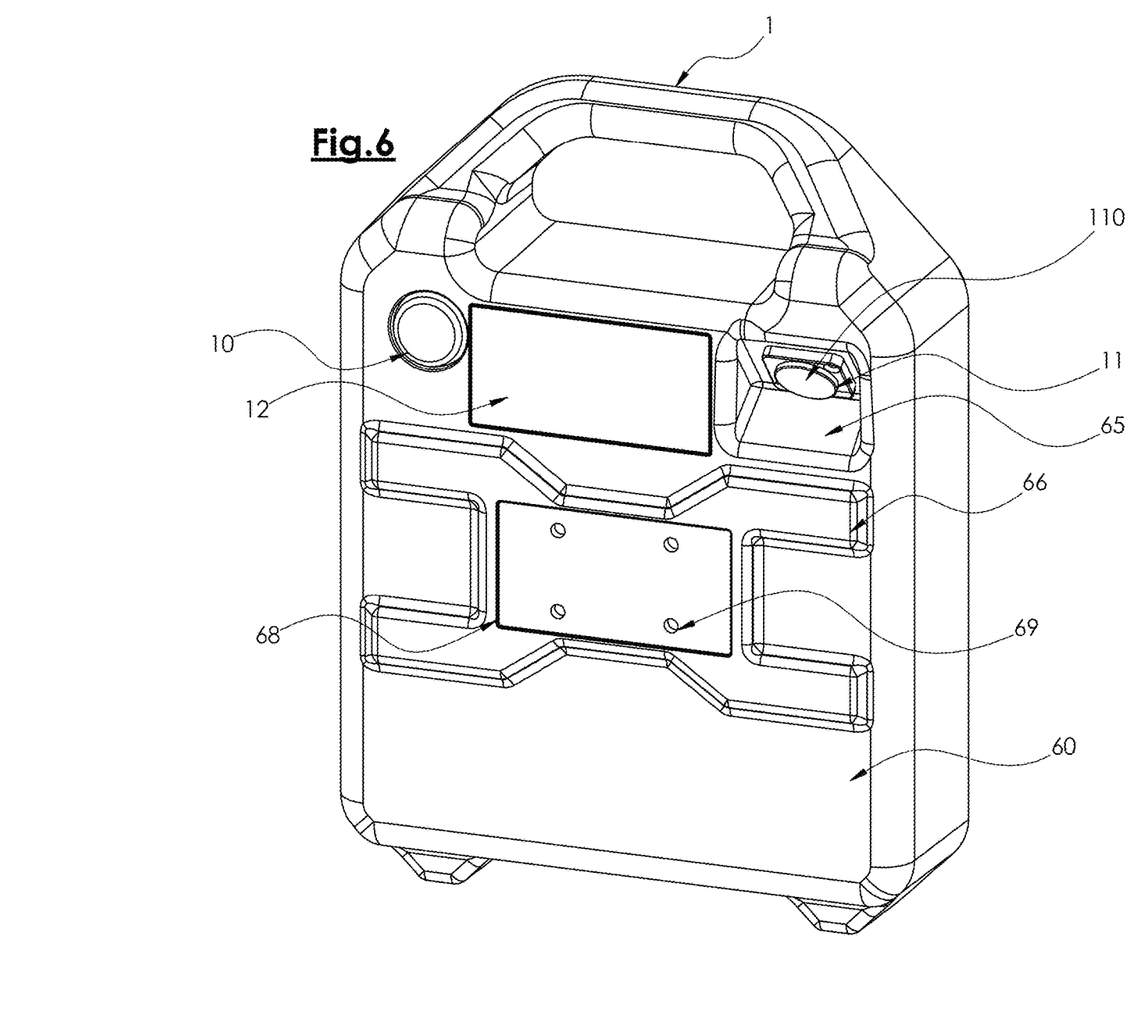
FIG. 6 shows a rear perspective view of the rear housing of the enclosure.
Figure 7:
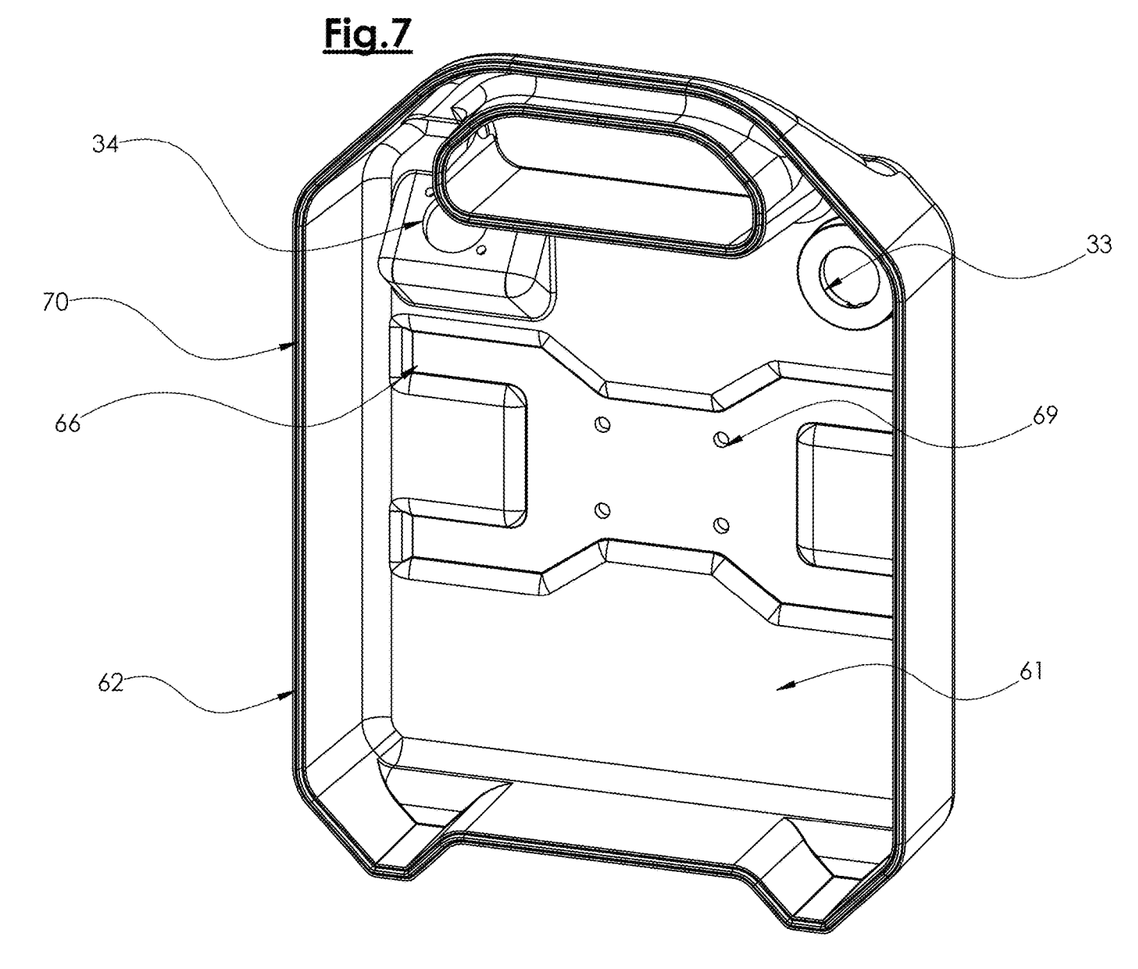
FIG. 7 shows a front perspective view of the rear housing of the enclosure.
Figure 8:
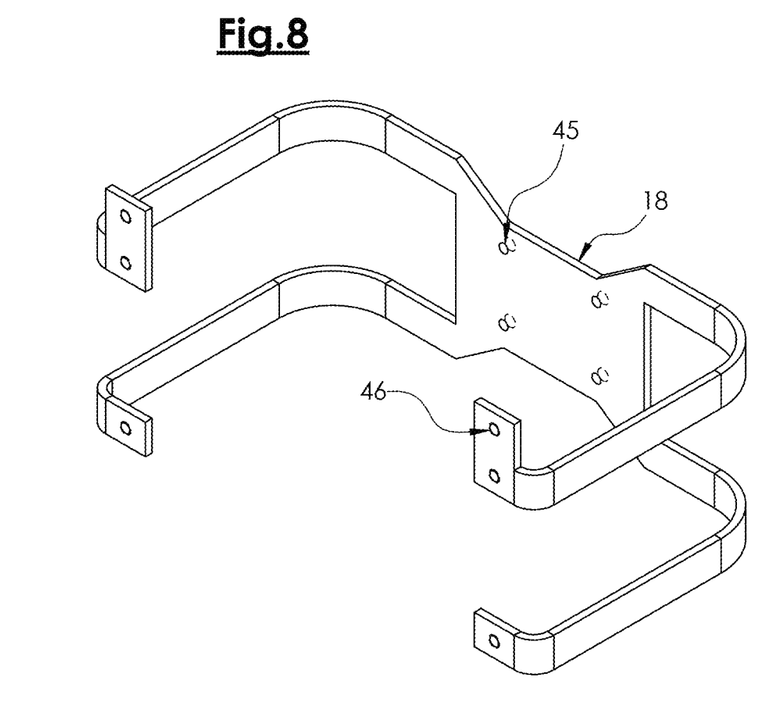
FIG. 8 shows a perspective view of a camera support bracket.
Figure 9:
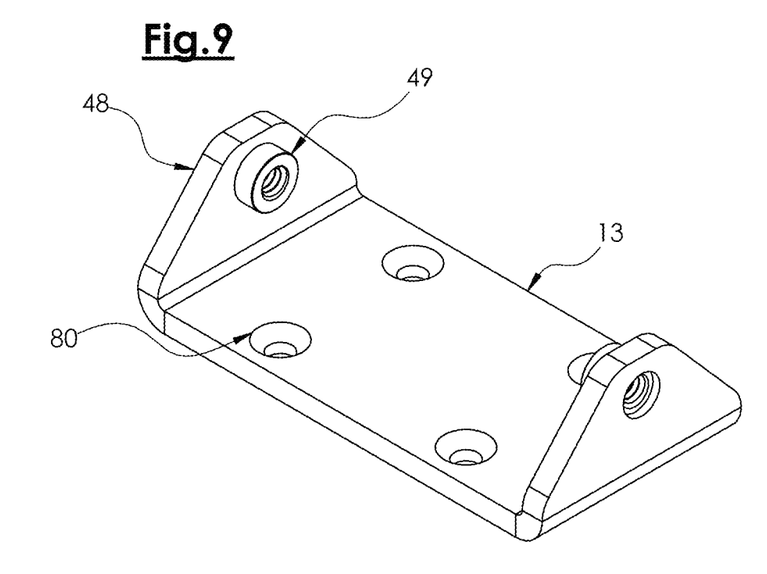
FIG. 9 shows a perspective view of a mounting support for the enclosure.

The interior of enclosure 100 preferably includes camera mounting bracket 18 for securing a camera to one or both of front housing 5 and rear housing 6. Securing the camera to the enclosure or at least one of front housing 5 and rear housing 6 serves to eliminate or reduce movement of the camera independent of enclosure 100. In a preferred embodiment, camera mounting bracket 18 is fastened through enclosure 100 to mounting support 130, for greater stability of the camera. FIGS. 6 and 7 show fastener access holes 69 allowing for a fastener to extend through rear housing 6 to camera mounting bracket 18.

Enclosure 100 may also include operational buttons or switches to control the enclosure, mounting support 130, or camera contained therein.

Front housing 5 and rear housing 6 are preferably manufactured of a durable material which is not susceptible to impact trauma or damage due to changes in temperature. The front housing and rear housing are preferably comprised of material that is not electrically conductive.

While certain novel features of the present invention have been shown and described, it will be understood that various omissions, substitutions and changes in the forms and details of the device illustrated and in its operation can be made by those skilled in the art without departing from the spirit of the invention.

We claim:

1. A protective enclosure for a camera, the enclosure comprising:
   a front housing formed by a front wall, the front wall comprising a planar surface, a first boundary wall surrounding the front wall and extending rearward therefrom, the first boundary wall forming a first continuous edge distal from the front wall and surrounding a first cavity, where the front wall comprises a protruding section, extending outward from the planar surface of the front wall;
   the protruding section comprising
      a window capable of allowing light to pass therethrough into the front housing, the window having a top edge, a bottom edge, and right and left sides;
a hood around the top edge and right and left sides of the window, the hood extending outward from the planar surface of the front wall;
a plurality of channels proximate to the right and left sides of the window, the plurality of channels providing pathways for diverting rainwater or debris away from the window and along sides of the protruding section;
a diverter wall located above the top edge of the window; and
an angled diverter located behind the diverter wall, the angled diverter presenting a slope pitched toward the plurality of channels;
a rear housing formed by a rear wall, a second boundary wall surrounding the rear wall and extending forward therefrom, the second boundary wall forming a second continuous edge distal from the rear wall and surrounding a second cavity; and
where the first continuous edge and the second continuous edge are of similar shapes, allowing the front housing and the rear housing to be joined together.

2. The protective enclosure for a camera of claim 1, the protruding section further comprising:
a chamfered edge at the bottom edge of the window.

3. The protective enclosure for a camera of claim 1, where the rear housing further comprises a power receptacle, the power receptacle allowing for the conducting of electricity into the protective enclosure.

4. The protective enclosure for a camera of claim 3, where the rear housing further comprises a recessed area surrounding the power receptacle.

5. The protective enclosure for a camera of claim 1, where the rear housing further comprises a combined power receptacle and data port, the combined power receptacle and data port allowing for the conducting of electricity and transmission of data into and out of the protective enclosure.

6. The protective enclosure for a camera of claim 1, where the rear housing further comprises a status indicator.

7. The protective enclosure for a camera of claim 6, where the status indicator further comprises a display.

8. The protective enclosure for a camera of claim 1, where the rear housing further comprises an access window.

9. The protective enclosure for a camera of claim 1, where at least one of the front housing and the rear housing further comprises a data port, the data port allowing for the transmission of data into and out of the protective enclosure.

10. The protective enclosure for a camera of claim 9, where the data port allows for the transmission of data to and from the camera.

11. The protective enclosure for a camera of claim 1, further comprising:
a camera mounting bracket secured within at least one of the front housing and the rear
housing, the camera mounting bracket capable of supporting the camera.

12. The protective enclosure for a camera of claim 1, where at least one of the first boundary wall and second boundary wall further comprises a descending foot.

13. The protective enclosure for a camera of claim 1, further comprising a waterproof seal between the first continuous edge and the second continuous edge.

14. The protective enclosure for a camera of claim 1, where at least one of the first boundary wall and second boundary wall further comprises a handle.

15. The protective enclosure for a camera of claim 1, further comprising:
a mounting support attached to the rear wall of the rear housing, the mounting support capable of securing the protective enclosure to an external object.

16. The protective enclosure for a camera of claim 15, where the mounting support further comprises:
a first enclosure support bracket attached to the rear wall of the rear housing, the first enclosure support bracket comprising a plane, the plane having a first flange extending away from the rear wall, where the first flange comprises a first pivot point;
a second enclosure support bracket comprising a panel, the panel having a second flange extending outward from the panel, the second flange comprising a second pivot point; and
where the first pivot point and second pivot point are moveably connected, allowing for rotational movement.

17. The protective enclosure for a camera of claim 16, where the second enclosure support bracket further comprises:
means for attaching the second enclosure support bracket to a surface.

18. The protective enclosure for a camera of claim 16, where the second enclosure support bracket further comprises:
means for attaching the second enclosure support bracket to a pole.

* * * * *